(12) United States Patent
Miller et al.

(10) Patent No.: US 8,754,626 B2
(45) Date of Patent: Jun. 17, 2014

(54) SWITCHING REGULATOR WITH INPUT CURRENT LIMITING CAPABILITIES

(75) Inventors: Ira G. Miller, Tempe, AZ (US); Ricardo Takase Goncalves, Chandler, AZ (US); John M. Pigott, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 821 days.

(21) Appl. No.: 12/818,270

(22) Filed: Jun. 18, 2010

(65) Prior Publication Data

US 2011/0309812 A1 Dec. 22, 2011

(51) Int. Cl.
*G05F 1/56* (2006.01)
*G05F 1/565* (2006.01)
*G05F 1/575* (2006.01)
*G05F 1/595* (2006.01)

(52) U.S. Cl.
USPC .......................................... 323/288; 323/271

(58) Field of Classification Search
USPC ......... 323/223–226, 238, 241–242, 246, 266, 323/268, 271, 282–288, 312, 316–317, 321, 323/322, 351, 908, 370; 363/74, 76–79, 363/123, 147
See application file for complete search history.

(56) References Cited

U.S. PATENT DOCUMENTS

| | | | |
|---|---|---|---|
| 5,414,342 A * | 5/1995 | Mammano et al. ........... | 323/288 |
| 5,731,694 A | 3/1998 | Wilcox et al. | |
| 5,731,731 A | 3/1998 | Wilcox et al. | |
| 5,912,552 A | 6/1999 | Tateishi | |
| 5,940,287 A | 8/1999 | Brkovic | |
| 6,515,463 B2 | 2/2003 | Ling | |
| 7,019,507 B1 * | 3/2006 | Dittmer et al. ................ | 323/284 |
| 7,348,812 B2 * | 3/2008 | Ikezawa ....................... | 327/131 |
| 7,388,444 B2 * | 6/2008 | Liao ............................ | 331/143 |
| 7,432,689 B2 * | 10/2008 | Miller et al. ................. | 323/259 |
| 7,719,249 B2 * | 5/2010 | Matyas et al. ............... | 323/285 |
| 2004/0232901 A1 * | 11/2004 | Huang et al. ................ | 323/282 |
| 2008/0094048 A1 * | 4/2008 | Basso et al. ................. | 323/283 |

OTHER PUBLICATIONS

Tang et al.; "Charge Control: Modeling, Analysis, and Design"; IEEE Transactions on Power Electronics; Oct. 1993; pp. 396-403; vol. 8, No. 4; IEEE.
"High Efficiency Battery Charger/USB Power Manager"; Data Sheet LTC4088; 24 pp; Linear Technology, Milpitas, CA.
"Switching Power Manager with USB On-the-Go + Triple Step-Down DC/DCs"; Data Sheet LTC3576/LTC3576-1; 48 pp; Linear Technology, Milpitas, CA.

(Continued)

*Primary Examiner* — Adolf Berhane
*Assistant Examiner* — Nusrat Quddus
(74) *Attorney, Agent, or Firm* — Daniel G. Dolezal; Daniel D. Hill (57) ABSTRACT

A switching regulator includes a capacitor, a charge control circuit, a discharge detector, a switch circuit, and a feedback circuit. The charge control circuit charges and discharges the capacitor. The discharge detector has an input coupled to the capacitor to detect when the capacitor has discharged to a predetermined level to indicate an over-current condition. The switch circuit is coupled to receive an input voltage. The switch circuit is made conductive and non conductive by a switching signal for supplying an output voltage at a regulated voltage level. The duty cycle of the switching signal is reduced in response to an indication of an over-current condition. The feedback circuit is for controlling a discharge rate of the capacitor.

21 Claims, 4 Drawing Sheets

(56) References Cited

OTHER PUBLICATIONS

U.S. Appl. No. 12/429,492, filed Apr. 24, 2009.

US Application entitled "Circuitry Having Gate Drivers Having a Shift Lever", filed herewith.
PCT/US2011/038319 International Search Report and Written Opinion mailed Feb. 9, 2012.

* cited by examiner

SWITCHING REGULATOR WITH INPUT CURRENT LIMITING CAPABILITIES

BACKGROUND OF THE INVENTION

1. Field of the Invention

This invention relates in general to switching regulators and more specifically to a switching regulator with input current limiting capabilities.

2. Description of the Related Art

Some electronic equipment require regulated power supply voltages for efficient and/or safe operation. Switching regulators are used to provide a regulated DC voltage and to adjust the voltage level from a DC power source such as a battery or an AC powered rectifier with filtering. A switching regulator generates a signal having a duty cycle to a control terminal of a power switch for controlling the voltage level of the regulated output voltage.

Some power sources may have limits on the amount of current that can be drawn from a power source. For example, for systems that charge a battery from a Universal Serial Bus (USB) connector, the amount of current drawn may be limited to a particular maximum level, e.g. 100 mA, 500 mA, or 950 mA at ±5%. Also, it may be desirable to limit the amount of current drawn by the regulator to prevent damage to the regulator.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

The following sets forth a detailed description of a mode for carrying out the invention. The description is intended to be illustrative of the invention and should not be taken to be limiting.

As described herein, a switching regulator includes current limiting capability that limits the amount of input current drawn by the switching regulator. The current limiting capability is implemented with a capacitor that is discharged at a rate depending upon the input current. Depending upon the rate of discharge of the capacitor, the duty cycle of switching signal is reduced during an over-current condition.

Figure 1:
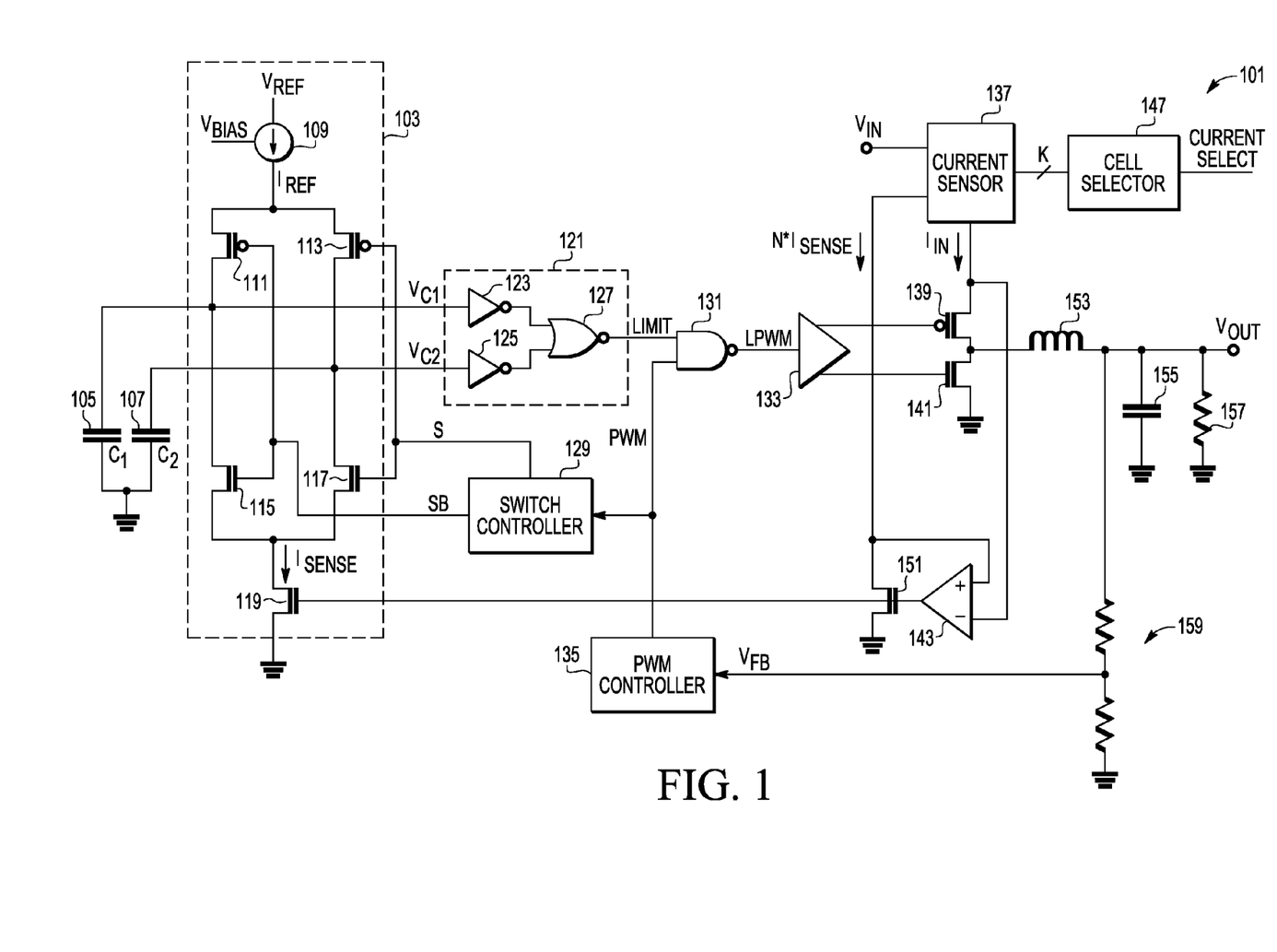
FIG. 1 is a circuit diagram of a DC switching regulator according to one embodiment of the present invention.
Figure 2:
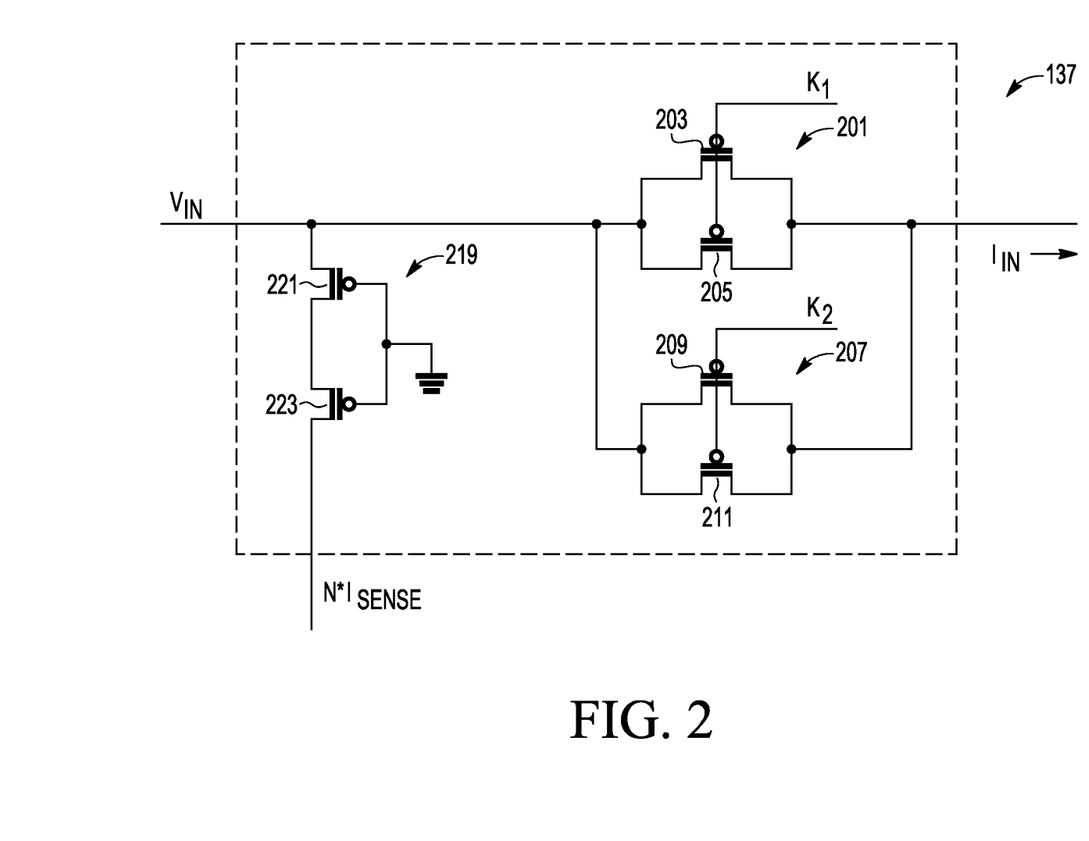
FIG. 2 is a circuit diagram of a current sensor according to one embodiment of the present invention.

FIG. 1 is a circuit diagram of a switching regulator with current limiting capability. In the embodiment shown, switching regulator 101 includes a power input terminal (labeled Vin) for receiving an input current at a DC voltage from a DC power source. In one embodiment, the power source is from a USB connector port, but may be from other DC sources in other embodiments. In the embodiment shown, regulator 101 includes a current sensor circuit 137 for generating a sensed current (N*Isense) that is proportional to the current (Iin) flowing out of the sensor to high side power switch 139. An embodiment of sensor circuit 137 is shown in FIG. 2. However, sensor circuit may have other configurations for generating a signal indicative of the current flowing through switch 139. For example, the sense circuit could be a transistor in parallel with high side switch 139.

In the embodiment shown, regulator 101 includes a low side power switch 141. However, in other embodiments, regulator 101 may include a fly back diode in place of switch 141. In one embodiment, switches 139 and 141 are implemented by a PFET and NFET respectively. However, in other embodiments, other types of power switches for switching regulators may be implemented such as bipolar transistors, power switches having multiple transistors, or other types of transistors.

Regulator 101 includes an inductor 153 and smoothing capacitor 155 for storing energy to provide a smooth regulated output voltage at the output terminal Vout. The load is represented by resistor 157. In one embodiment, the load may be a battery charger or other type of electronic device e.g. MP3 player, cell phone, or portable computer that is powered by DC power.

Regulator 101 includes a pulse width modulated controller 135 that receives a feed back voltage (VFB) from voltage divider 159 that is proportional to the output voltage. Controller uses the feed back voltage VFB to set the duty cycle of a pulse width modulated signal (PWM). In one embodiment, the pulse width modulated signal alternates between a high voltage level (e.g. 2.7 V) and a low voltage level (e.g. 0V) at a duty cycle that is dependent upon VFB in order to provide Vout at a particular output voltage.

When in a non over-current condition (current Iin is lower than a specific limiting amount), the PWM signal controls the conductivity of power switches 139 and 141. When PWM is at a high voltage, differential driver circuit 133 provides a low voltage to the control terminal (a gate of a MOSFET) to make switch 139 conductive and provides a low voltage to the control terminal to make switch 141 non conductive. When PWM is at a low voltage, the differential driver circuit 133 provides a high voltage to the control terminal of switch 139 to make switch 139 non conductive and provides a high voltage to the control terminal of switch 141 to make switch 141 conductive. The voltage of Vout is determined by the amount of time that switch 139 is conductive versus the amount of time that it is non conductive.

In one embodiment, driver circuit 133 includes level shifting circuitry for converting a voltage swing (0-2.7 V) of the input signal of driver circuit 133 to an adequate range (e.g. 0-5.0 V) to make conductive and non conductive power switches 139 and 141. One example of a driver circuit can be found in an application entitled "CIRCUIT HAVING GATE DRIVERS HAVING A LEVEL SHIFTER," having an attorney docket number of RA 48545ZC, having a common assignee, and being filed concurrently with this application, and which is hereby incorporated by reference in its entirety. In one embodiment, driver circuit 133 is configured such that switches 139 and 141 are not conductive at the same time. In one embodiment, this is accomplished by feeding the signal provided to the control terminal of switch 139 to the circuitry of driver circuit 133 that provides the control signal to switch 141 and by feeding the signal provided to the control terminal of switch 141 to the circuitry of driver circuit 133 that provides the control signal to switch 139. These feed back signals are used to prevent one switch of switches 139 and 141 from being made conductive until the other switch is non conductive for a particular period of time.

Regulator 101 includes a circuit for detecting an over-current condition and reducing the ratio of the amount of time that switch 139 is conductive versus being non conductive when the over-current condition is detected. In the embodiment shown, this circuit utilizes the sensed current (N*Isense) to generate a proportional sense current (Isense) to alternately discharge capacitors 105 and 107 during PWM cycles. If the capacitors discharge below a threshold during a duty cycle due to an over-current condition, then discharge detector 121 provides a gating signal to gate the voltage state of the PWM signal corresponding to switch 139 being conductive in providing LPWM. In one embodiment, the high voltage portion of the PWM signal determines the amount of time that switch 139 would be conductive if regulator 101 is in a non over-current condition. However, in other embodiments, the PWM signal may be inverted subsequent to being gated.

Regulator 101 includes op amp 143 and transistors 151 and 119 for generating Isense which is proportional to N*Isense generated from current sensor circuit 137. Op amp 143 drives transistor 151 to a conductivity such that the current pulled through the drain of transistor 151 generates a voltage that equals the voltage at the inverting input of op amp 143. The voltage at the output of the power transistors (See FIG. 2) of current sensor circuit 137 is applied to the inverting input of op amp 143 that drives transistor 151 until the voltage on the non-inverting input of op amp 143 is equal to the inverting input. The current (N*Isense) at the drain of transistor 151 is a fraction of the larger current (Iin), which is the current flowing through power switch 139 when conductive. The ratio of N*Isense to Iin is a function of the source to drain resistances of the sense transistors (e.g. 221 and 223 in FIG. 2) to the enabled power transistors (e.g. 201, 205, 209, and 211) of current sensor circuit 137.

The value of N is dependent upon the ratio of the width of transistor 151 to the width of transistor 119. In one embodiment N is 10 but may be other ratios in other embodiments.

Regulator 101 includes a charge control circuit 103 that controls the charging and discharging of capacitors 105 and 107. In the embodiment shown, circuit 103 includes reference current generator 109 that provide a reference current Iref for charging capacitors 105 and 107. The value of Iref can be trimmed by adjusting the value of VBias (e.g. by blowing fuses in one embodiment). Generator 109 is connected to a reference voltage terminal (Vref) that in one embodiment is a power supply voltage (VDD).

Capacitor 105 (capacitor C1) is charged by Iref by making switch 111 (implemented as a PFET in the embodiment shown) conductive and making switch 115 (implemented as an NFET in the embodiment shown) non conductive. Capacitor 105 is discharged by Isense by making switch 115 conductive and switch 111 non conductive. Transistor 119 has a current electrode connected to a power supply terminal (a ground terminal). Transistor 119 acts as a current sink.

Capacitor 107 (capacitor C2) is charged by Iref by making switch 113 (implemented as a PFET in the embodiment shown) conductive and making switch 117 (implemented as an NFET in the embodiment shown) non conductive. Capacitor 107 is discharged by Isense by making switch 117 conductive and switch 113 non conductive.

The conductivity of switches 113 and 117 is controlled by signal S and the conductivity of switches 111 and 115 is controlled by an inverted signal of signal S (SB). Signals S and SB are provided by Switch controller 129. In one embodiment, signals S and SB are square wave clock signals that have a frequency of ½ the frequency of the PWM signal.

Regulator 101 includes discharge detector 121 that detects whether the capacitors 105 and 107 are discharged below a particular level and in response, provides a Limit signal to gate the on-time of the duty cycle of the PWM Signal in signal LPWM, which also stops further discharge of either capacitor until the end of the respective PWM cycle. In the embodiment shown, the particular discharge level corresponds to a voltage of the threshold voltage of inverters 123 and 125. Detector 121 also includes NOR gate 127 which provides at its output the Limit signal. The Limit signal is provided to NAND gate 131 to gate the conductive voltage state of the PWM signal in signal LPWM to reduce the duty cycle due to an over-current condition. Driver circuit 133 controls the conductivity of switches 139 and 141 as per the LPWM signal.

Cell selector 147 provide a K signal that controls the number of cells to be enabled in cell sensor circuit 137. In one embodiment, selector 147 includes a level shifter to take a voltage signal that varies between 0-1.5 volts to a signal that varies between 0-5.0 for providing the K signal values.

FIG. 2 is a circuit diagram of one embodiment of current sensor circuit 137. Sensor circuit 137 provides a sense current N*Isense that is proportional to the current Iin provided to power switch 139. Current sensor circuit 137 includes power transistors 203, 205, 209, and 211 and sense transistors 221 and 223. These transistor are sized and arranged such that N*Isense is significantly less than Iin but at a ratio that is of a particular accuracy. The ratio of N*Isense to Iin is dependent upon the number of cells enabled in circuit 137.

In the embodiment shown, regulator 101 has a buck regulator configuration. However, in other embodiments, the regulator may have other switching regulator configurations such as a boost regulator configuration. For example, in one embodiment of a synchronous boost configuration, a sense transistor may be placed to mirror at small ratio the current flowing through the high side power switch to provide a sense current.

In the embodiment shown, sensor circuit 137 has two switchable cells that can be enabled or disabled depending upon the selection signal (K1 and K2) received from cell selector 147 (See FIG. 1). In one embodiment, the selection signals are controlled by current selector signal received from a register (not shown). In one embodiment, the current selector signal would be changed during operation of the electronic device such as by processor controlling the device. In other embodiments, it may be hardwired or set during manufacture (e.g. by fuses). In one embodiment, the number of cells enabled by circuit 137 limits that amount of input current drawn by regulator 101.

In the embodiment shown, each cell (201, 207) includes two power transistors in configured in parallel. For example, cell 207 (controlled by the K1 signal) includes power transistors 203 and 205. Cell 207 (controlled by the K2 signal) includes power transistors 209 and 211. By asserting both the K1 and K2 signals, both cells are enabled in the circuit. If only K1 is asserted, then only cell 201 is enabled.

The ratio of N*Isense to Iin is changed with respect to the number cells (201, 207) enabled. The more cells enabled means that a greater number of power transistors are conductive, thereby reducing the voltage drop across the power transistors. Thus, with more cells enabled, more current Iin is needed to produce the same amount of reference current (N*Isense). If an over-current condition is equated to N*Isense being of a particular value e.g. 100 micro-amps, then it would take twice as much Iin current to generate that value of N*Isense with the resistance across the power transistors being one half (with 2 cells enabled) as it would be with only one cell enabled.

Accordingly, the input current which generates an over-current condition can be adjusted be selectively enabling a particular number of cells. Thus, the number of cells enabled controls the over-current value. In one embodiment, If all cells were enabled, the ratio of N*Isense to Iin would be 1 to 12,000, whereas if only half the cells were enabled, the ratio would be 1 to 6,000. However, other ratios may be implemented in other embodiments.

The ratio of N*Isense to Iin is also affected by the ratio of the widths of transistors 221 and 223 to the power transistors 203, 205, 209 and 211. In one embodiment, the width of each sense transistors 221 and 223 is significantly less than the width of each of the power transistors. In one embodiment, the equivalent width of the power transistors is 190 µm and the equivalent width of the sense transistors is 38 µm. With a combination of parallel devices for the power transistors and a combination of series devices for the sense transistors, a ratio of W/L of the power transistors to sense transistors equal to 9500 is achieved. This results in a 100 µA N*$I_{sense}$ transistor current when the power transistor Iin current is 950 mA.

In the embodiment shown, the control terminals (a gate of a FET) of the sense transistors 221 and 223 are tied to ground. However in other embodiments, the control terminals may be tied to a switch that could selectively make the sense transistor non conductive to disable the over-current limiting capabilities of the circuit.

Although in FIG. 2, two cells (201 and 207) of power transistors with two power transistors each are shown, other embodiments may have a different number of cells and a different number of power transistors per cell. For example, one embodiment may include 24 cells of power transistors with each cell including four power transistors. In one embodiment, different cells may have a different number of power transistors from the other cells.

Other embodiments may include a different number of sense transistors. For example, one embodiment may include 192 sense transistors in series. In one embodiment, the width to length ratio of the sense transistor are less than the width to length ratio of the power transistors. In one embodiment, the transistors of current sensor circuit 137 are implemented in a sea of gates in an integrated circuit in which regulator 101 is implemented.

Figure 3:
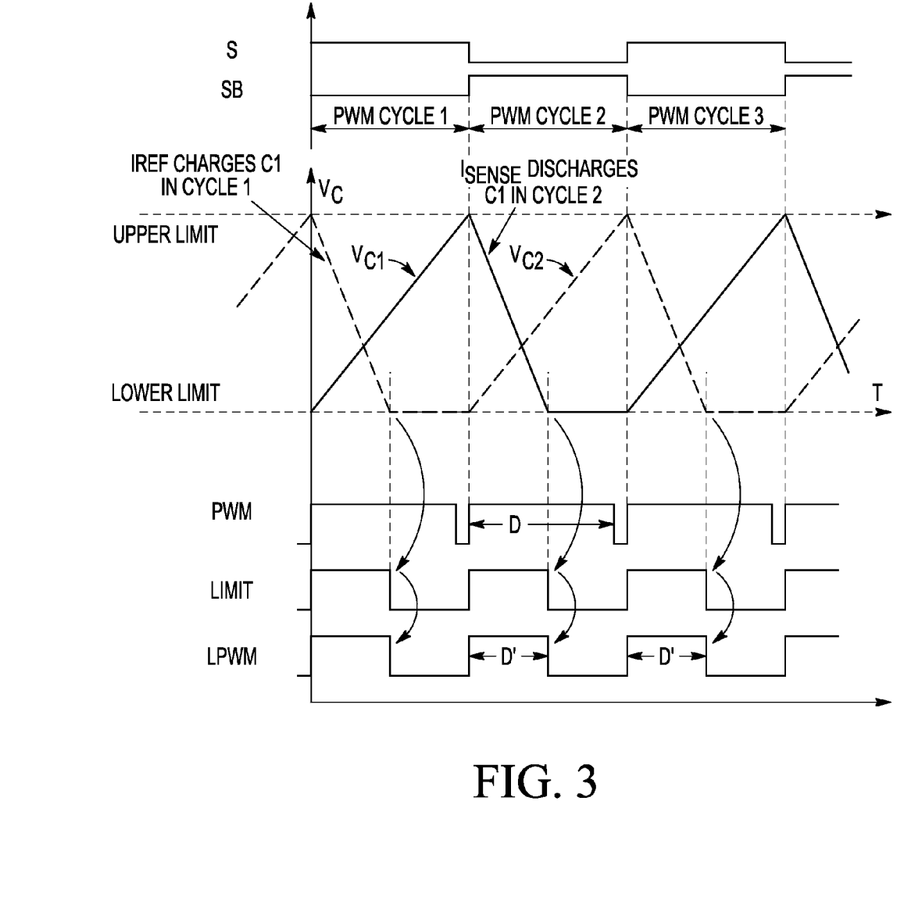
FIG. 3 is a timing diagram showing the operation of a DC switching regulator according to one embodiment of the present invention.

FIG. 3 is a timing diagram of showing the operation of regulator 101 in an over-current condition. FIG. 3 shows the S, SB, PWM, Limit, and LPWM signals along with voltages VC1 (shown in the solid line) and VC2 (shown in the dashed line) which are the voltages of capacitors C1 and C2 respectively. In the embodiment shown, capacitors C1 (105) and C2 (107) are charged and discharged on alternating cycles of the PWM signal as controlled by the S and SB signals. For example, when C1 is being charged in cycle 1 C2 is being discharged. In cycle 2, C1 is being discharged and C2 is being charged. Capacitor C1 is charged by the Iref current when the SB signal is low and discharged by the Isense current when SB is high. Capacitor C2 is charged by Iref when the S signal is low and discharged by Isense when the S signal is high. S and SB are inverted signals of each other.

During a PWM cycle that a capacitor (C1 or C2) is being discharged, if the voltage corresponding to the charge of the capacitor (VC1 or VC2) reaches the lower limit (the threshold voltage of inverter 123 or 125, respectively) before the end of the cycle, the Limit signal will transition to a low voltage state. The Limit signal transitioning to a low voltage state causes the LPWM signal to be at the low voltage state (a non conducting state for switch 139). For example, in FIG. 3, VC1 reaches the lower limit at time TT2 which causes the Limit signal to transition to a low voltage level. The Limit signal transitioning to the low voltage state causes (through NAND gate 131) the LPWM signal to go to a low voltage. Because the Limit signal goes low before the end of the on-time (denoted as D in FIG. 3) of the PWM signal (corresponding to power switch 139 being conductive), the LPWM signal has a shorter on-time (D') than the on-time (D) of the PWM signal. Thus, during an over-current condition, the time that power switch 139 is conductive during a cycle is reduced from the on-time (D) of the PWM signal to the on-time (D') of the LPWM signal. Accordingly, during an over-current condition, the time that switch 139 is conductive during a PWM cycle is reduced by reducing the duty cycle of the signal controlling switch 139 to reduce the amount of current received from a DC power source.

When the voltage of the capacitor (C1 or C2) reaches the lower limit, the discharging of the capacitor ceases because the LPWM signal goes low causing switch 139 to become non conductive. When this happens, Iin, N*Isense, and correspondingly Isense flowing through transistor 119 become zero, which stops the discharge of the capacitor.

As shown in FIG. 3, the LIMIT signal going low causes switch 139 to turn off and stop consuming current from the input during the remainder of the clock cycle. In a steady-state condition, in each PWM cycle, the charge delivered to each capacitor (105, 107) is Q=Iref*Tclk, where Tclk is the duration of a clock cycle, and the charge consumed from each capacitor is Isense*D'. These quantities are equal in steady state operation. Since Isense is proportional to the instantaneous current in switch 139, the total charge passing through switch 139 in each cycle is regulated and therefore the average current consumed from the input is regulated.

As shown in FIG. 3, the greater the amount of current through switch 139, the faster capacitor C1 or C2 dischargers, and the greater then reduction in the duty cycle of the signal controlling the conductivity of switch 139 during an over-current condition.

Figure 4:
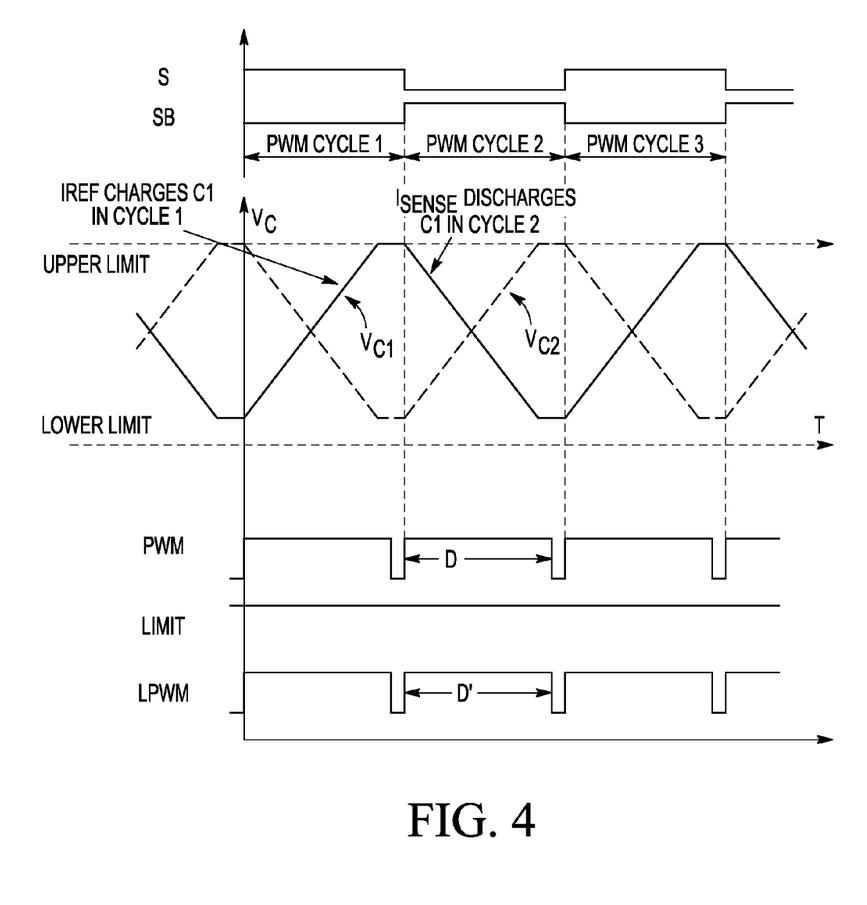
FIG. 4 is a timing diagram showing the operation of a DC switching regulator according to one embodiment of the present invention.

FIG. 4 is a timing diagram showing the operation regulator 101 in a non over-current condition. In a non over-current condition, Isense is not great enough to discharge the capacitor (either C1 or C2) during a PWM cycle period to the lower limit to cause the Limit signal to go to a low voltage state. Accordingly, the Limit signal never goes to a low voltage state. Because the Limit signal never goes to a low voltage state, the LPWM signal is controlled by the PWM signal. Thus, the on-time (D) of the PWM signal is equal to the on-time (D') of the LPWM signal, and the current is not limited.

In FIG. 4, the VC1 and VC2 are limited at an upper amount by the charging capacity of capacitors C1 and C2 respectively and by the voltage available from the supply of Iref.

In some embodiments, providing a switching regulator that has a current limiting capacity that utilizes a capacitor whose discharge is a rate dependent upon the input current may allow for a reduction in input current provided to a switching regulator that is based upon how severe the over-current condition is. The greater the overcurrent condition, the greater the amount the duty cycle is reduced. Furthermore, in some embodiments, reducing the duty cycle of the power switch to control input current may allow for a more energy efficient way to limit current as opposed to an in-line current limiting device whose resistance is increased to reduce the current. Furthermore, in some embodiments, using a circuit to gate the PWM signal may allow for a more efficient and simple generation of the PWM signal as opposed to a circuit that reduces the duty cycle of the PWM signal being generated. Furthermore, in some embodiments, measuring an overcurrent condition based on the discharge of a capacitor allows for the over-current condition to be determined based on an integration of current over time as opposed to an instantaneous measure of current. Furthermore in some embodiments, limiting the duty cycle based on an integration of current over time may allow for a feedback control loop that has better stability characteristics. One embodiment allows the use three simple logic gates for the compare function. Also, with some embodiments, an accurate compare voltage may not be needed.

In the embodiments shown, the over-current detection was performed using two capacitors that are alternately charged and discharged every other PWM cycle. However, in other embodiments, a different number of capacitors maybe used for over-current protection. For example, one capacitor may be used to detect an over-current condition. In one example of a one capacitor detection circuit, the duty cycle of the signal controlling switch 139 would be limited by the Limit signal on every other PWM cycle. In another example of a one capacitor detection circuit, the clock signal (e.g. S) would be at the frequency of the PWM signal. In such an embodiment, Iref could be sized such that it quickly charges the capacitor during the first part of the clock cycle. Also, the duty cycle of the clock signal could be changed such the charging clock state is relatively shorter as compared to the discharging clock state. In some embodiments, a two capacitor system allows simpler control of Iref and may avoid the need to add any further subdivisions of the time of the duty cycle signals.

In one embodiment, a switching regulator includes a capacitor and a charge control circuit coupled to the capacitor. The charge control circuit charges and discharges the capacitor. The switching regulator includes a discharge detector including an input coupled to the capacitor. The discharge detector asserts a limiting signal in response to detecting when charge on the capacitor has discharged to a predetermined level. The switching regulator includes a power switch circuit coupled to receive current from a power input of the switching regulator. The power switch circuit is coupled to receive a switching signal to control the conductivity of the power switch circuit for supplying an output voltage at a voltage level dependent upon a duty cycle of the switching signal. The duty cycle of the switching signal is altered to reduce current flowing from the power input through the power switch circuit based upon the limiting signal indicating that the capacitor has discharged to the predetermined level. The switching circuit includes a feedback circuit providing a current signal indicative of an amount of current from the power input through the power switch circuit. The charge control circuit discharges the capacitor based upon the current signal.

In another embodiment, a switching regulator includes a first capacitor, a second capacitor, and a charge control circuit including a first terminal coupled to the first capacitor and a second terminal coupled to the second capacitor. The charge control circuit alternately charges and discharges the first and second capacitors. The switching regulator includes a discharge detector including a first input coupled to the first capacitor and a second input coupled to the second capacitor. The discharge detector provides an indication indicating that a charge on one of the first and second capacitors has discharged to a predetermined level. The switching regulator includes a power switch circuit coupled to receive current from a power input. The power switch circuit is coupled to receive a switching signal for controlling the conductivity of the power switch circuit for supplying an output voltage at a voltage level dependent upon a duty cycle of the switching signal. The duty cycle of the switching signal is altered to reduce current flowing from the power input through the power switch circuit based upon the indication indicating that a charge on one of the first and second capacitors has discharged to a predetermined level. The switching regulator includes a feedback circuit for controlling a discharge rate of the first and second capacitors based on an amount of current flowing through the power switch circuit from the power input.

In another embodiment, a method for operating a switching regulator includes alternately charging and discharging a capacitor in response to a clocking signal, and during each cycle of the clocking signal, detecting whether a charge on the capacitor has discharged to a predetermined level. The method includes controlling the conductivity of a power switch of the switching regulator with a switching signal to provide an output voltage at an output terminal of the switching regulator. A duty cycle of the switching signal is altered to reduce current flowing from a power source through the power switch based upon a detection that the capacitor has discharged to the predetermined level. The capacitor is discharged at a rate dependent upon an amount of current flowing from the power source through the power switch.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A switching regulator comprising:
   a capacitor;
   a charge control circuit coupled to the capacitor, the charge control circuit for charging and discharging the capacitor;
   a discharge detector including an input coupled to the capacitor, the discharge detector for asserting a limiting signal in response to detecting when charge on the capacitor has discharged to a predetermined level;
   a power switch circuit coupled to receive current from a power input of the switching regulator, the power switch circuit coupled to receive a switching signal to control the conductivity of the power switch circuit for supplying an output voltage at a voltage level dependent upon a duty cycle of the switching signal, wherein the duty cycle of the switching signal is altered to reduce current flowing from the power input through the power switch circuit based upon the limiting signal indicating that the capacitor has discharged to the predetermined level;
   a feedback circuit providing a current signal indicative of an amount of current from the power input through the power switch circuit, wherein the charge control circuit discharges the capacitor based upon the current signal;
   wherein the charge control circuit comprises:
      a current source including a first terminal coupled to receive a reference voltage and a second terminal;
      a first transistor including a first current terminal coupled to the second terminal of the current source, a control terminal for receiving a clocking signal, and a second current terminal coupled to both a terminal of the capacitor and the input of the discharge detector;
      a second transistor including a first current terminal coupled to the second current terminal of the first transistor, a control terminal for receiving the clocking signal, and a second current terminal; and a current sink including a first terminal coupled to the second current terminal of the second transistor, a control terminal coupled to the feedback circuit to receive the current signal, and a second terminal coupled to a supply voltage terminal.

2. The switching regulator of claim 1, wherein the discharge detector comprises an inverter, wherein the predetermined level is a charge corresponding to a threshold voltage of the inverter.

3. The switching regulator of claim 1, wherein the power switch circuit comprises:
a transistor including a first current terminal coupled to receive current from the power input, a control terminal responsive to the switching signal, and a second current terminal coupled to an output terminal of the switching regulator, the output terminal for supplying the output voltage.

4. The switching regulator of claim 1, wherein the feedback circuit comprises an operational amplifier including a first input coupled to the power switch circuit, a second input coupled to a signal line that receives a sense current indicative of an amount of current from the power input through the power switch circuit, and an output terminal coupled to the charge control circuit to control the discharge rate of the capacitor.

5. The switching regulator of claim 1, further comprising:
a pulse width modulation controller including an input coupled to receive a voltage signal indicative of the output voltage, and an output coupled to provide a pulse width modulated signal at a duty cycle, wherein the duty cycle of the pulse width modulated signal is based on the voltage signal;
wherein the switching signal is based on the pulse width modulated signal;
wherein the limiting signal when indicating that the capacitor has discharged to the predetermined level, reduces the duty cycle of the switching signal from a value being controlled by the duty cycle of the pulse width modulated signal to a lower duty cycle to limit the current from the power input through the power switch circuit.

6. A switching regulator comprising:
a capacitor;
a charge control circuit coupled to the capacitor, the charge control circuit for charging and discharging the capacitor;
a discharge detector including an input coupled to the capacitor, the discharge detector for asserting a limiting signal in response to detecting when charge on the capacitor has discharged to a predetermined level;
a power switch circuit coupled to receive current from a power input of the switching regulator, the power switch circuit coupled to receive a switching signal to control the conductivity of the power switch circuit for supplying an output voltage at a voltage level dependent upon a duty cycle of the switching signal, wherein the duty cycle of the switching signal is altered to reduce current flowing from the power input through the power switch circuit based upon the limiting signal indicating that the capacitor has discharged to the predetermined level;
a feedback circuit providing a current signal indicative of an amount of current from the power input through the power switch circuit, wherein the charge control circuit discharges the capacitor based upon the current signal;
a second capacitor coupled to the charge control circuit, the discharge detector for asserting a second limiting signal in response to detecting when charge on the second capacitor has discharged to a predetermined level, wherein the duty cycle of the switching signal is altered to reduce current flowing from the power input through the power switch circuit based upon the second limiting signal indicating that the second capacitor has discharge to the predetermined level.

7. The switching regulator of claim 6, wherein the charge control circuit comprises:
a current source including a first terminal coupled to receive a reference voltage and a second terminal;
a first transistor including a first current terminal coupled to the second terminal of the current source, a control terminal for receiving a clocking signal, and a second current terminal coupled to both a terminal of the capacitor and the input of the discharge detector;
a second transistor including a first current terminal coupled to the second current terminal of the first transistor, a control terminal for receiving the clocking signal, and a second current terminal; and
a current sink including a first terminal coupled to the second current terminal of the second transistor, a control terminal coupled to the feedback circuit to receive the current signal, and a second terminal coupled to a supply voltage terminal.

8. The switching regulator of claim 7, wherein the capacitor is charged and discharged during each cycle of the clocking signal.

9. The switching regulator of claim 6, wherein the capacitor and the second capacitor are charged and discharged alternately during sequential cycles of the switching signal, wherein the capacitor is discharged while the second capacitor is charged and the second capacitor is discharged by the capacitor is charged.

10. A switching regulator comprising:
a first capacitor;
a second capacitor;
a charge control circuit including a first terminal coupled to the first capacitor and a second terminal coupled to the second capacitor, the charge control circuit for alternately charging and discharging the first and second capacitors;
a discharge detector including a first input coupled to the first capacitor and a second input coupled to the second capacitor, the discharge detector providing an indication indicating that a charge on one of the first and second capacitors has discharged to a predetermined level;
a power switch circuit coupled to receive current from a power input, the power switch circuit coupled to receive a switching signal for controlling the conductivity of the power switch circuit for supplying an output voltage at a voltage level dependent upon a duty cycle of the switching signal, wherein the duty cycle of the switching signal is altered to reduce current flowing from the power input through the power switch circuit based upon the indication indicating that a charge on one of the first and second capacitors has discharged to a predetermined level; and
a feedback circuit for controlling a discharge rate of the first and second capacitors based on an amount of current flowing through the power switch circuit from the power input.

11. The switching regulator of claim 10, wherein:
the discharge detector comprises a first inverter including an input coupled to the first capacitor and a second inverter including an input coupled to the second capacitor;

the discharge detector provides the indication in response to the first capacitor discharging to a level corresponding to the threshold voltage of the first inverter or the second capacitor discharging to a level corresponding to the threshold voltage of the second inverter.

12. The switching regulator of claim 10, wherein the charge control circuit comprises:
a current source including a first terminal coupled to receive a reference voltage and a second terminal;
a first transistor including a first current terminal coupled to the second terminal of the current source, a control terminal for receiving a first clocking signal, and a second current terminal coupled to both a terminal of the first capacitor and the first input of the discharge detector;
a second transistor including a first current terminal coupled to the second current terminal of the first transistor, a control terminal for receiving the first clocking signal, and a second current terminal;
a third transistor including a first current terminal coupled to the second terminal of the current source, a control terminal for receiving a second clocking signal, and a second current terminal coupled to both a terminal of the second capacitor and a second input of the discharge detector;
a fourth transistor including a first current terminal coupled to the second current terminal of the third transistor, a control terminal coupled for receiving the second clocking signal, and a second current terminal coupled to the second current terminal of the second transistor; and
a current sink including a first terminal coupled to the second current terminal of the second transistor, a control terminal coupled to the feedback circuit to receive a current signal, and a second terminal coupled to a supply voltage terminal.

13. The switching regulator of claim 10, further comprising:
a pulse width modulation controller including an input coupled to receive a voltage signal indicative of the output voltage, and an output coupled to provide a pulse width modulated signal at a duty cycle, wherein the duty cycle of the pulse width modulated signal is based on the voltage signal;
wherein the switching signal is based on the pulse width modulated signal;
wherein when the discharge detector provides an indication indicating that a charge on one of the first and second capacitors has discharged to a predetermined level, the duty cycle of the switching signal is reduced from a value being controlled by the duty cycle of the pulse width modulated signal to a lower duty cycle to limit the current from the power input through the power switch circuit.

14. The switching regulator of claim 13 further comprising:
a logic circuit including a first input to receive the indication from the discharge detector and a second input to receive the pulse width modulated signal, wherein the logic circuit includes an output to provide a gated pulse width modulated signal that has a reduced duty cycle when the discharge detector indicates that a charge on one of the first and second capacitors has discharged to a predetermined level.

15. The switching regulator of claim 13 wherein the pulse width modulated signal is provided at a first frequency, wherein each of the first and second capacitor is charged and discharged at a rate that is one half of the first frequency.

16. A method for operating a switching regulator, the method comprising:
alternately charging and discharging a capacitor in response to a clocking signal;
during each cycle of the clocking signal, detecting whether a charge on the capacitor has discharged to a predetermined level;
controlling the conductivity of a power switch of the switching regulator with a switching signal to provide an output voltage at an output terminal of the switching regulator;
wherein a duty cycle of the switching signal is altered to reduce current flowing from a power source through the power switch based upon a detection that the capacitor has discharged to the predetermined level;
wherein the capacitor is discharged at a rate dependent upon an amount of current flowing from the power source through the power switch;
alternately charging and discharging a second capacitor in response to a second clocking signal;
during each cycle of the second clocking signal, detecting whether a charge on the second capacitor has discharged to a predetermined level;
wherein the duty cycle is altered to reduce current flowing from the power source to the output terminal through the power switch based upon a detection that the second capacitor has discharge to the predetermined level.

17. The method of claim 16, further comprising:
generating a pulse width modulated signal, wherein a duty cycle of the pulse width modulated signal is based upon the output voltage,
controlling the duty cycle of the switching signal by the duty cycle of the pulse width modulated signal;
wherein the duty cycle of the switching signal is reduced from a value being controlled by the duty cycle of the pulse width modulated signal in response a detection that the capacitor has discharged to a predetermined level.

18. The method of claim 16 further comprising:
generating a current sensed signal indicative of the current flowing from the power input to the power switch,
wherein the discharging of the capacitor is controlled by the current sensed signal.

19. A method for operating a switching regulator, the method comprising:
alternately charging and discharging a capacitor in response to a clocking signal;
during each cycle of the clocking signal, detecting whether a charge on the capacitor has discharged to a predetermined level;
controlling the conductivity of a power switch of the switching regulator with a switching signal to provide an output voltage at an output terminal of the switching regulator;
wherein a duty cycle of the switching signal is altered to reduce current flowing from a power source through the power switch based upon a detection that the capacitor has discharged to the predetermined level;
wherein the capacitor is discharged at a rate dependent upon an amount of current flowing from the power source through the power switch;
generating a pulse width modulated signal, wherein a duty cycle of the pulse width modulated signal is based upon the output voltage,
controlling the duty cycle of the switching signal by the duty cycle of the pulse width modulated signal;

wherein the duty cycle of the switching signal is reduced from a value being controlled by the duty cycle of the pulse width modulated signal in response a detection that the capacitor has discharged to a predetermined level;

wherein the clocking signal has a frequency that is one half a frequency of the pulse width modulated signal.

20. The method of claim 19, further comprising:

alternately charging and discharging a second capacitor in response to a second clocking signal;

during each cycle of the second clocking signal, detecting whether a charge on the second capacitor has discharged to a predetermined level;

wherein the duty cycle is altered to reduce current flowing from the power source to the output terminal through the power switch based upon a detection that the second capacitor has discharge to the predetermined level.

21. The method of claim 20, wherein the alternately charging and discharging the capacitor and alternately charging and discharging the second capacitor includes discharging the capacitor while charging the second capacitor and discharging the second capacitor which charging the capacitor.

* * * * *